(No Model.)
G. G. RAMBAUD.
VACCINE POINT PROTECTOR.
No. 585,007. Patented June 22, 1897.
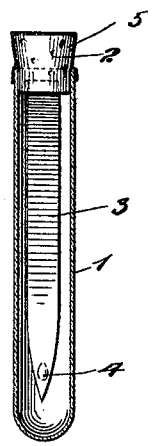
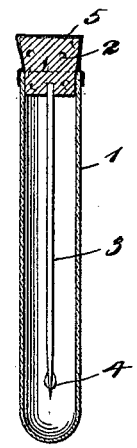

UNITED STATES PATENT OFFICE.

GEORGE G. RAMBAUD, OF NEW YORK, N. Y.

VACCINE-POINT PROTECTOR.

SPECIFICATION forming part of Letters Patent No. 585,007, dated June 22, 1897.

Application filed October 24, 1896. Serial No. 609,891. (No model.)

*To all whom it may concern:*

Be it known that I, GEORGE G. RAMBAUD, residing in New York city, in the county and State of New York, have invented a new and Improved Vaccine-Point Protector, of which the following is a full, clear, and exact description.

This invention relates to devices for protecting vaccine-points or the virus on said points. It is the common practice to place several vaccine-points in a single package, and the points at the time of packing may be sterilized collectively, but it is obvious that after once opening the package to remove one of the points for use the remaining points will be exposed to the air, thus endangering the lymph by contact with foreign substances that may be floating in the air. One object of my invention is to obviate this danger, and another object is to render it possible to employ liquid virus in connection with an ivory point, which is not possible when several points are packed or placed together.

I will describe a vaccine-point protector embodying my invention and then point out the novel features in the appended claim.

Reference is to be had to the accompanying drawings, forming a part of this specification, in which similar characters of reference indicate corresponding parts in both views.

Figure 1 is a longitudinal section of a protector embodying my invention and showing the point therein, and Fig. 2 is a longitudinal section at right angles to Fig. 1.

Referring to the drawings, 1 designates a casing closed at one end and open at the other. This casing will preferably be made of glass, although I do not confine my invention to any particular material for forming the casing. Adapted to fit in the open end of the casing 1 is a stopper 2, (here shown as consisting of cork,) and attached to this stopper 2 is an ivory or similar vaccine-point 3, to the end of which is applied a liquid or semi-liquid virus 4.

It will be seen that the point 3 has its end seated in a transverse groove or channel formed in the stopper 2, and when the said stopper is inserted in the casing 1 the said point will be held centrally therein and out of engagement with the wall or closed end of the casing. Thus it will be impossible to remove or destroy the virus by abrasion of the point with the interior of the casing.

Before placing the virus 4 on the point the casing, the point, and the stopper are all thoroughly sterilized under a high degree of heat, say 150° centigrade. After sterilization the point is removed quickly from the casing and inserted in the liquid virus and then immediately placed in the casing, and the stopper or cork is rendered impervious to air by means of a sealing material 5—such, for instance, as paraffin. Thus prepared, the virus may be kept for several months in a cool place.

It is obvious that as each point is isolated in a tube or casing all danger of infection or deterioration of the lymph or virus by contact with foreign substances or by exposure to the air is avoided.

Before using, the virus, being in a semifluid form, does not require the addition of moisture, which is sometimes a source of infection. Therefore it will be seen that my method of protecting a vaccine-point has great advantages, inasmuch as the liquid vaccine or virus may be employed with a point.

Having thus described my invention, I claim as new and desire to secure by Letters Patent—

A vaccine-point protector, comprising a casing closed at one end and open at the other, a stopper for the open end thereof, a vaccine-point having liquid virus thereon and having one end inserted into the stopper, and a sealing material placed over the stopper, substantially as specified.

GEO. G. RAMBAUD.

Witnesses:
A. A. HOPKINS,
C. R. FERGUSON.